US011386928B2

(12) United States Patent
Yamamoto et al.

(10) Patent No.: US 11,386,928 B2
(45) Date of Patent: Jul. 12, 2022

(54) DATA STORAGE DEVICE DEMODULATING SERVO STRIPES USING MATCHED FILTER

(71) Applicant: Western Digital Technologies, Inc., San Jose, CA (US)

(72) Inventors: Satoshi Yamamoto, San Jose, CA (US); Derrick E. Burton, Ladera Ranch, CA (US); Masahito Kobayashi, Ibaraki (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/176,024

(22) Filed: Feb. 15, 2021

(65) Prior Publication Data

US 2022/0108721 A1    Apr. 7, 2022

Related U.S. Application Data

(60) Provisional application No. 63/086,153, filed on Oct. 1, 2020.

(51) Int. Cl.
 *G11B 5/596* (2006.01)
 *G11B 5/584* (2006.01)
 (Continued)

(52) U.S. Cl.
 CPC .......... *G11B 5/59627* (2013.01); *G11B 5/584* (2013.01); *G11B 5/59622* (2013.01);
 (Continued)

(58) Field of Classification Search
 None
 See application file for complete search history.

(56) References Cited

U.S. PATENT DOCUMENTS 6,937,413 B2 * 8/2005 Bui ................. G11B 5/584
360/48
6,940,683 B2 * 9/2005 Berman ............ G11B 5/584
360/77.12

(Continued)

FOREIGN PATENT DOCUMENTS

KR    20080089599 A    10/2008

OTHER PUBLICATIONS

International Search Report and the Written Opinion for International Application No. PCT/US2021/038154 dated Oct. 22, 2021, 9 pages.

*Primary Examiner* — K. Wong
(74) *Attorney, Agent, or Firm* — Patterson + Sheridan, LLP; Steven H. Versteeg

(57) ABSTRACT

A data storage device is disclosed comprising at least one head configured to access a magnetic tape comprising a plurality of servo frames each comprising a plurality of servo bursts, wherein each servo burst comprises a plurality of servo stripes. The servo stripes in a first servo burst are read using the head to generate a first read signal that is processed using a first matched filter matched to the first servo burst in order to generate an average time stamp for the servo stripes in the first servo burst. A position error signal (PES) is generated based on the average time stamp of the first servo burst, and the head is positioned relative to the magnetic tape based on the PES.

20 Claims, 12 Drawing Sheets

(51) Int. Cl.
*G11B 19/04* (2006.01)
*G11B 5/78* (2006.01)

(52) U.S. Cl.
CPC ............ *G11B 5/59655* (2013.01); *G11B 5/78* (2013.01); *G11B 19/045* (2013.01)

(56) References Cited

U.S. PATENT DOCUMENTS

| | | | |
|---|---|---|---|
| 7,245,450 B1 * | 7/2007 | Cherubini ............... | G11B 5/584 360/27 |
| 7,369,342 B2 * | 5/2008 | Bui ........................ | G11B 5/584 360/39 |
| 7,480,114 B2 | 1/2009 | Cherubini et al. | |
| 7,742,254 B2 | 6/2010 | Cherubini et al. | |
| 8,054,568 B2 | 11/2011 | Cherubini et al. | |
| 8,054,575 B2 * | 11/2011 | Fasen ..................... | G11B 5/584 360/77.12 |
| 8,139,312 B2 | 3/2012 | Bui et al. | |
| 8,422,162 B2 | 4/2013 | Cherubini et al. | |
| 8,760,795 B2 | 6/2014 | Cherubini et al. | |
| 9,443,539 B2 | 9/2016 | Cherubini et al. | |
| 9,524,741 B1 * | 12/2016 | Cherubini .......... | G11B 5/00826 |
| 9,564,168 B2 | 2/2017 | Cherubini et al. | |
| 10,026,428 B1 | 7/2018 | Bui et al. | |
| 10,199,062 B2 | 2/2019 | Bui et al. | |
| 2005/0231845 A1 | 10/2005 | Shirouzu | |
| 2007/0097537 A1 | 5/2007 | Hoerger et al. | |
| 2008/0100952 A1 | 5/2008 | Trabert et al. | |
| 2008/0239559 A1 | 10/2008 | Goker et al. | |
| 2010/0079890 A1 | 4/2010 | Brummet | |
| 2012/0019948 A1 | 1/2012 | Fasen | |
| 2020/0035264 A1 | 1/2020 | Judd et al. | |

* cited by examiner

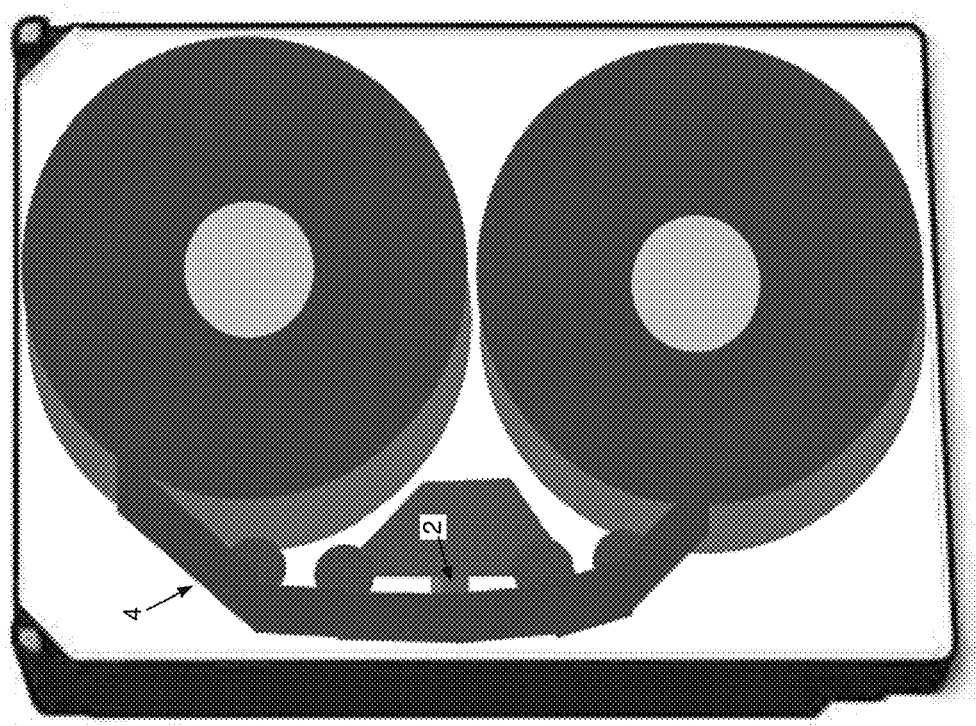
FIG. 1A
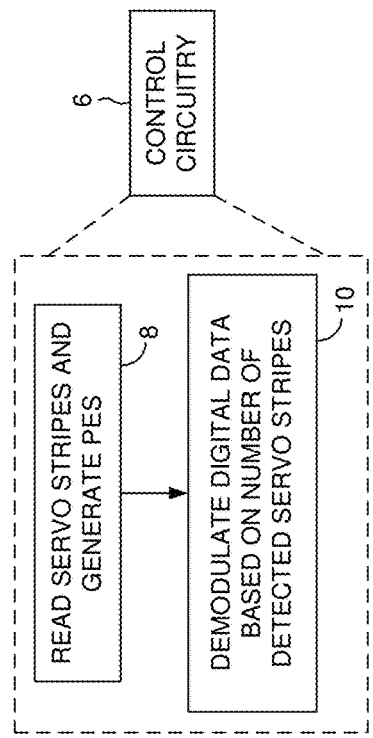
FIG. 1B
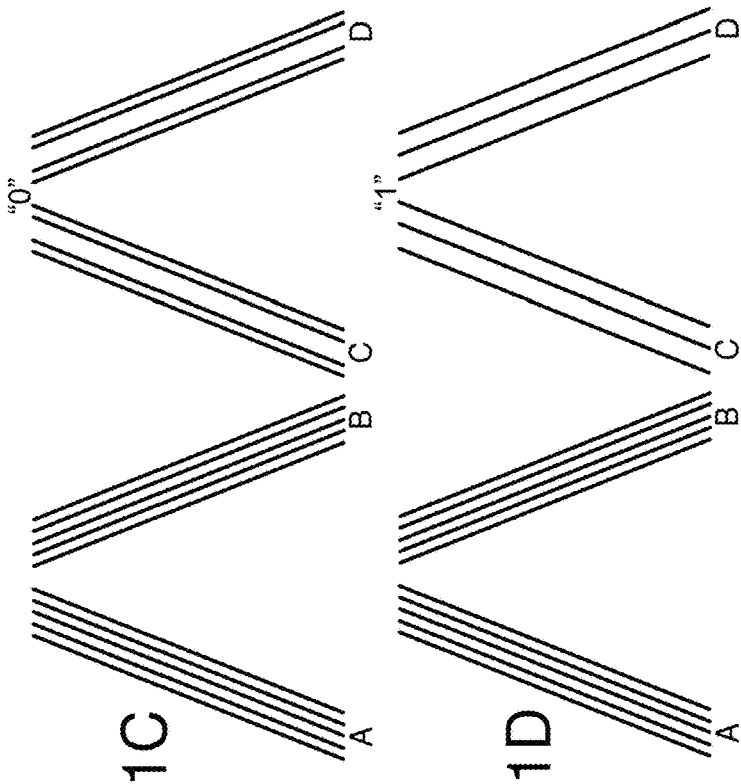
FIG. 1C
FIG. 1D

US 11,386,928 B2

DATA STORAGE DEVICE DEMODULATING SERVO STRIPES USING MATCHED FILTER

CROSS REFERENCE TO RELATED APPLICATIONS

This application claims priority to U.S. Provisional Patent Application Ser. No. 63/086,153, filed on Oct. 1, 2020, which is hereby incorporated by reference in its entirety.

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

BRIEF DESCRIPTION OF THE DRAWINGS

FIG. 1A shows a data storage device according to an embodiment comprising at least one head configured to access a magnetic tape.

FIG. 1B is a flow diagram according to an embodiment wherein digital data is demodulated based on a number of servo stripes in a servo frame.

FIGS. 1C and 1D show a servo frame wherein an A and B servo burst consists of five servo stripes, and a C and D servo burst consists of four servo stripes when representing a digital "0" or three servo stripes when representing a digital "1".

DETAILED DESCRIPTION

Figure 1E:
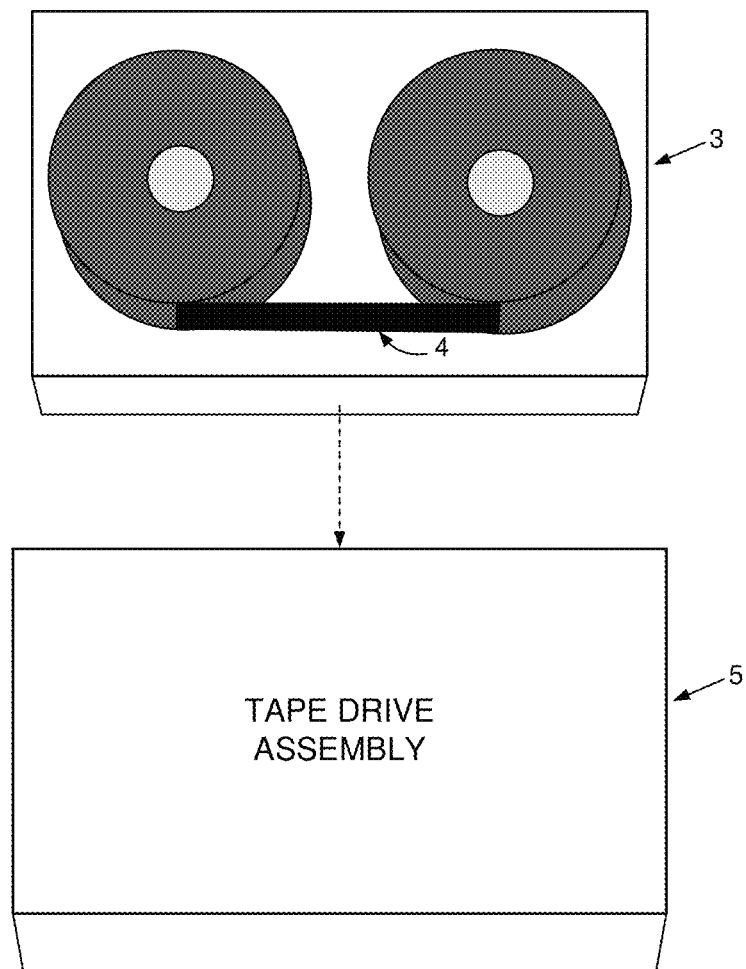
FIG. 1E shows a data storage device comprising a cartridge assembly comprising a magnetic tape, and a tape drive assembly configured to access the magnetic tape.

FIGS. 1A and 1B show a data storage device according to an embodiment comprising at least one head 2 configured to access a magnetic tape 4 comprising a plurality of servo frames each comprising a plurality of servo stripes (e.g., FIG. 1C or 1D). The data storage device further comprises control circuitry 6 configured to execute the flow diagram of FIG. 1B, wherein the servo stripes are read using the head to generate a read signal which is processed to detect a position error signal (PES) used to control a position of the head relative to the magnetic tape (block 8). The read signal is also demodulated into digital data based on a number of servo stripes detected in each servo frame (block 10).

In the embodiment of FIG. 1A, the data storage device comprises an embedded magnetic tape 4 installed into a tape drive assembly which, in one embodiment, may be the same form factor as a conventional disk drive. In another embodiment shown in FIG. 1E, the magnetic tape 4 may be housed in a cartridge assembly 3 that is inserted into (and ejected from) a tape drive assembly 5 similar to a conventional tape drive manufactured under the Linear Tape-Open (LTO) standard. In one embodiment, the tape drive assembly 5 comprises the head 2 configured to access the magnetic tape 4, and the control circuitry 6 configured to execute the flow diagram of FIG. 1B.

FIGS. 1C and 1D show an example servo frame according to an embodiment wherein a first subframe comprises A and B servo bursts each consisting of five servo stripes, and a second subframe comprises C and D servo bursts each consisting of four servo stripes when representing a digital "0" or three servo stripes when representing a digital "1". Any suitable digital data may be encoded into the servo frames, such as a longitudinal position of the head along the length of the magnetic tape. In the example embodiment of FIGS. 1C and 1D, a single bit of the digital data is encoded into each servo frame, whereas in other embodiments described in greater detail below, multiple bits may be encoded into each servo frame. In one embodiment, the differing number of servo stripes between the sub-frames may also be used to distinguish between the subframes. That is, in one embodiment the A and B servo bursts of the first subframe may be considered a "sync" subframe which is distinguished from the second subframe due to having five servo stripes per servo burst as compared to four or three servo stripes per servo burst. Each servo stripe may be written to the magnetic tape in any suitable manner, wherein in one embodiment each servo stripe may be written as an isolated dibit using a suitable write head.

In one embodiment, the PES for controlling the lateral position of the head relative to the width of the magnetic tape is generated based on a ratio of time intervals detected between the servo stripes. For example, a first time interval may be measured between a servo stripe in the A servo burst and a corresponding servo stripe in the B servo burst, and a second time interval may be measured between the servo stripe in the A servo burst and a corresponding servo stripe in the C servo burst. The PES may then be generated as the ratio of the first and second time intervals, wherein the ratio is independent of the speed of the magnetic tape. In one embodiment, multiple time intervals may be measured for multiple of the servo stripes, wherein the resulting ratios may be averaged in order to generate the PES in a manner that attenuates noise that may otherwise obfuscate a single ratio measurement. In another embodiment described below, an average timestamp may be generated for each servo burst and the time intervals measured based on the average timestamps in order to attenuate noise in the PES measurement.

Figure 2A:
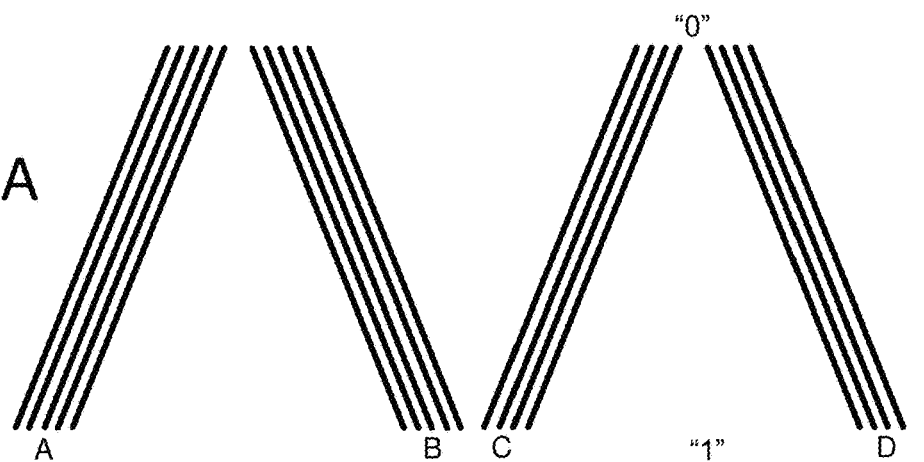
FIGS. 2A and 2B show a prior art servo frame wherein digital data is demodulated from the C and D bursts based on a time shift of the servo stripes.
Figure 2B:
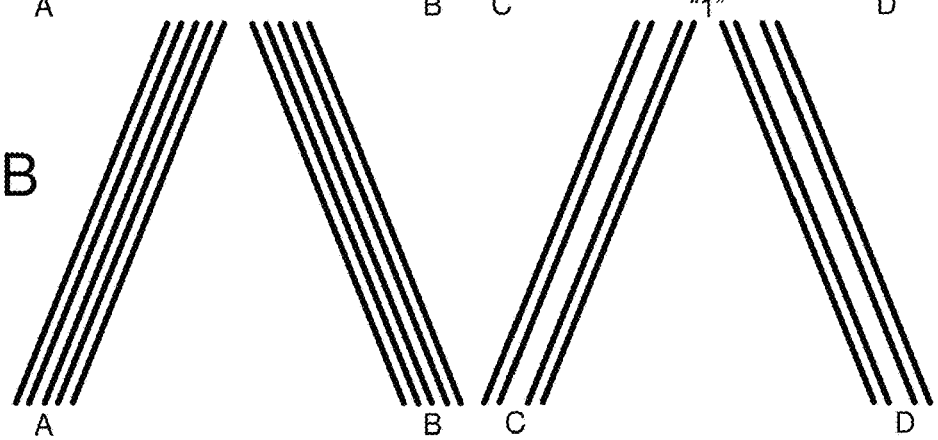

FIGS. 2A and 2B shows a prior art format of a {5,4} servo frame meaning the first subframe of A and B servo bursts consist of five servo stripes, and the second subframe of C and D servo bursts consist of four servo stripes. A digital "0" or "1" is encoded into the second subframe based on time shifting the servo stripes. That is, in FIG. 2A a "0" is encoded into the second subframe by recording the servo stripes without a time shift, and in FIG. 2B a "1" is encoded into the second subframe by recording the second and fourth servo stripes with a time shift relative to the first and second servo stripes.

Figure 3A:
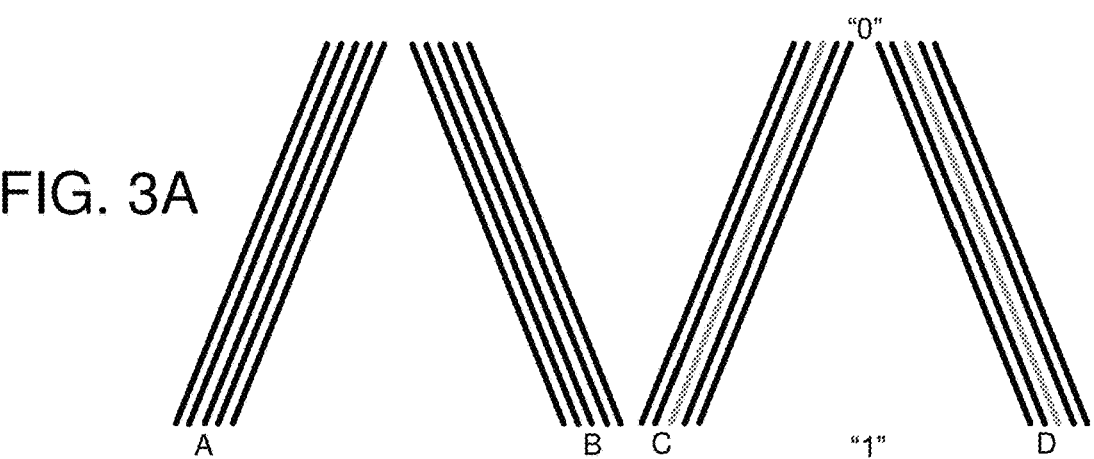
FIGS. 3A and 3B show an embodiment wherein a format of the servo stripes in the A and B servo bursts matches a format of the servo stripes in the C and D servo bursts except for one or two missing servo stripes depending on whether the servo stripes represent a digital "0" or "1".
Figure 3B:
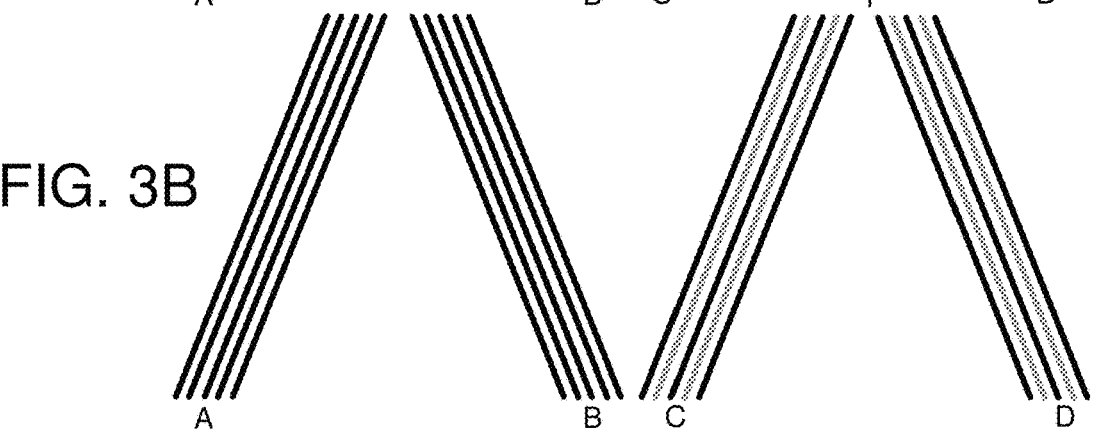

FIGS. 3A and 3B show an embodiment wherein a digital value is encoded by varying the number of servo stripes written to the C and D servo bursts. In FIG. 3A a "0" is encoded by writing a {5,4} servo frame, and in FIG. 3B a "1" is encoded by writing a {5,3} servo frame. In this embodiment, a format of the servo stripes in the first subframe of A and B servo bursts matches a format of the servo stripes in the second subframe of C and D servo bursts except for a single missing servo stripe (the middle servo stripe) when encoding a "0" as shown in FIG. 3A. A format of the servo stripes in the first subframe of A and B servo bursts matches a format of the servo stripes in the second subframe of C and D servo bursts except for two missing servo stripes (the second and fourth servo stripes) when encoding a "1" as shown in FIG. 3B. Accordingly in this embodiment, when measuring the PES time intervals between the servo stripes within a subframe as well as between the subframes the pairing of the servo stripes remains constant. Alternatively when measuring an average timestamp for each servo burst, one or more missing servo strips within a servo burst does not change the average timestamp measurement. Also in this embodiment, the spacing of the servo stripes (including the missing servo stripes) in the first and second subframes remains constant such that the width of the first and second subframes are substantially equal, thereby simplifying the demodulation of the servo frames regardless as to the direction of tape movement (forward or backward).

Figure 4A:
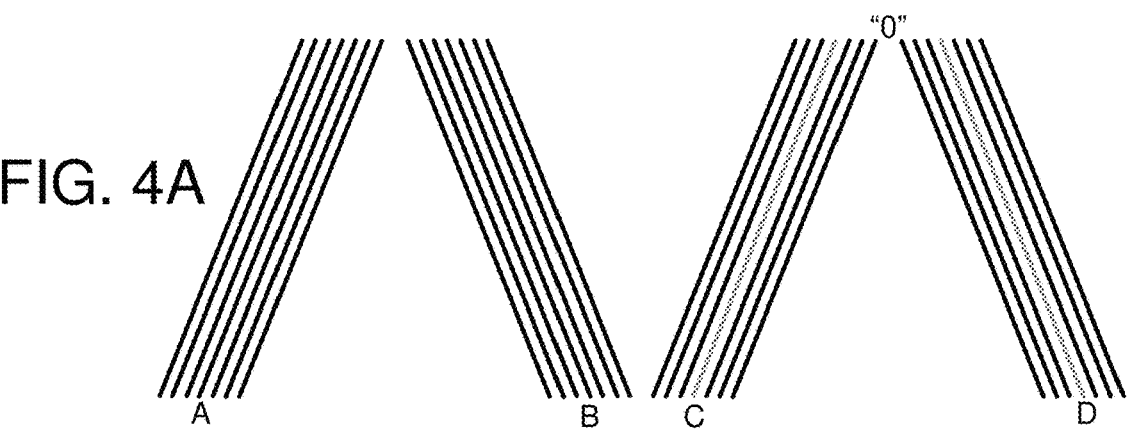
FIGS. 4A-4D show an embodiment wherein the missing servo stripes in the C and D servo bursts represent one of four digital values.
Figure 4B:
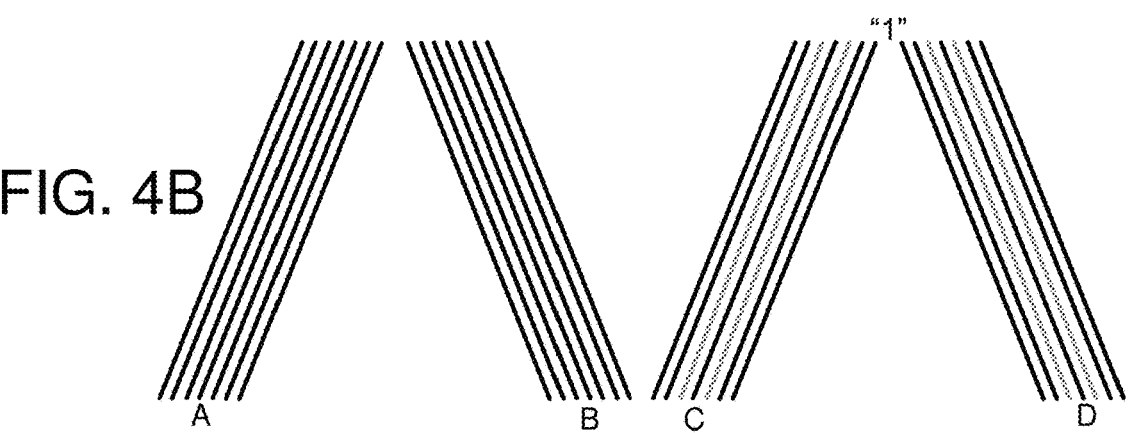
Figure 4C:
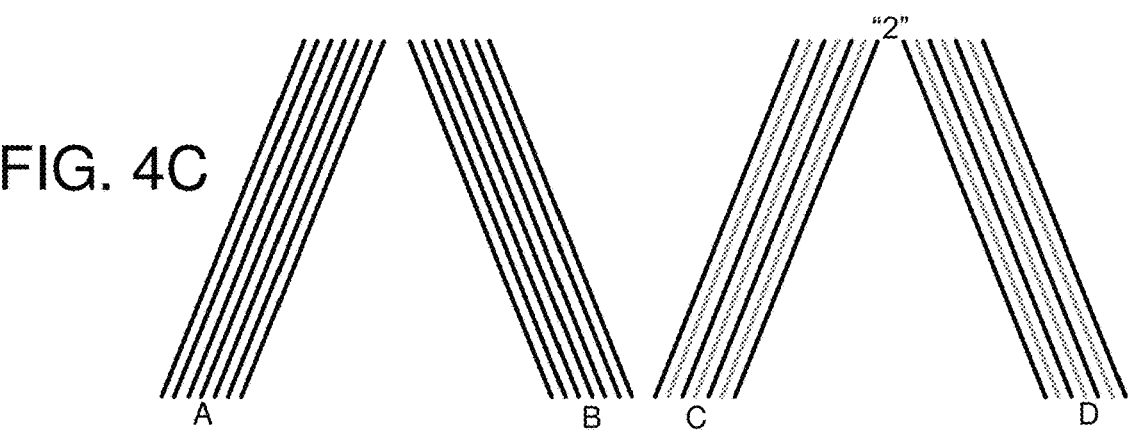
Figure 4D:
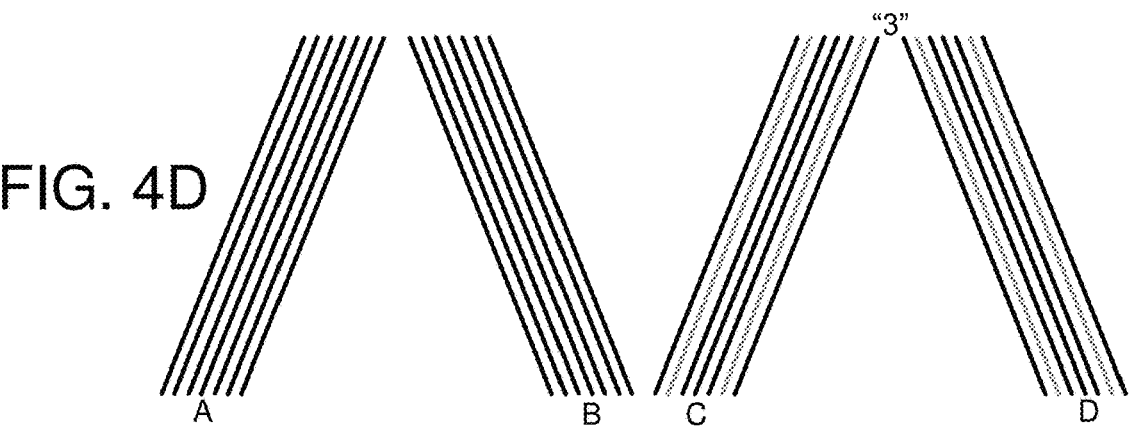
Figure 5A:
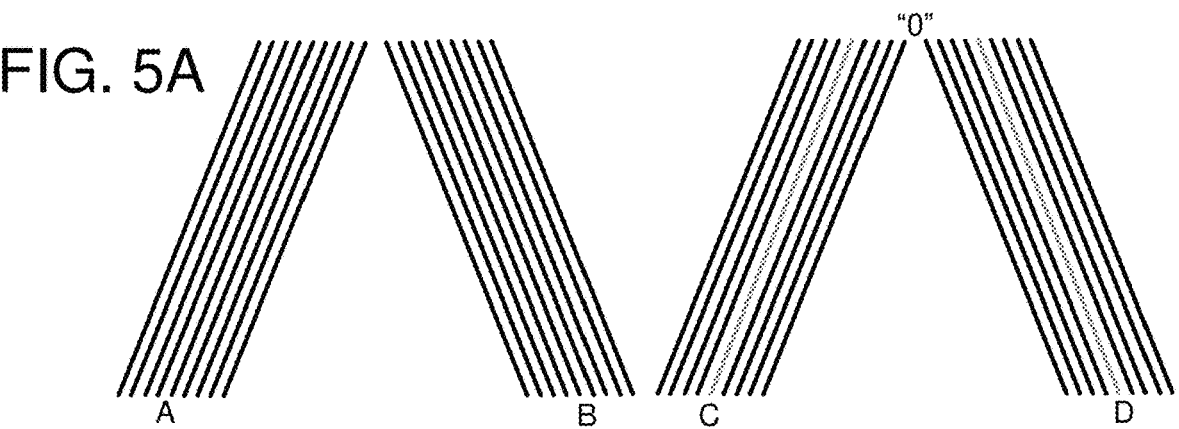
FIGS. 5A-5H show an embodiment wherein the missing servo stripes in the C and D servo bursts represent one of eight digital values.
Figure 5B:
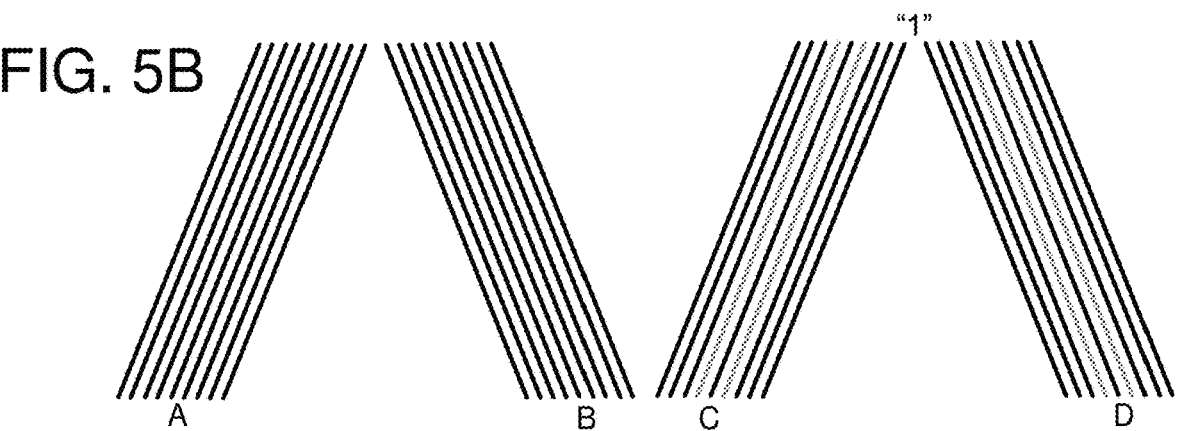
Figure 5C:
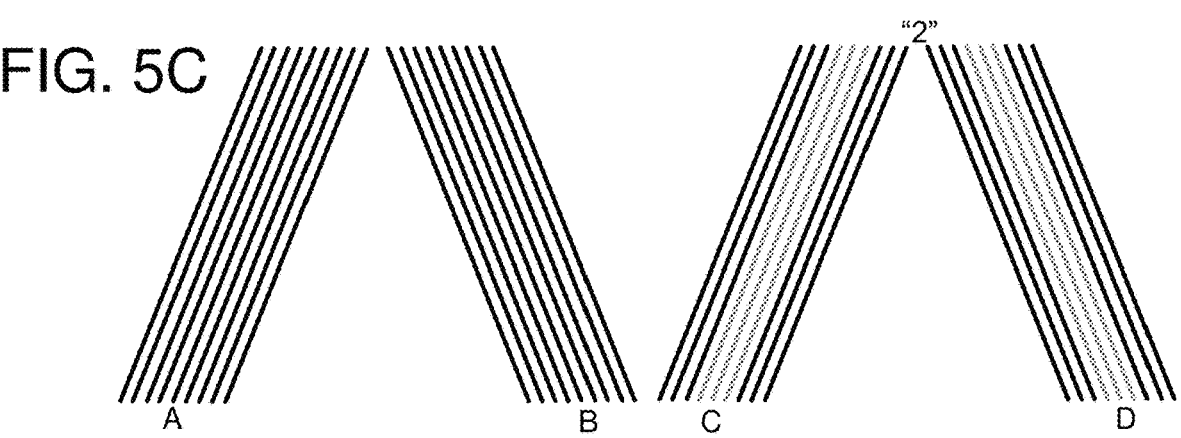
Figure 5D:
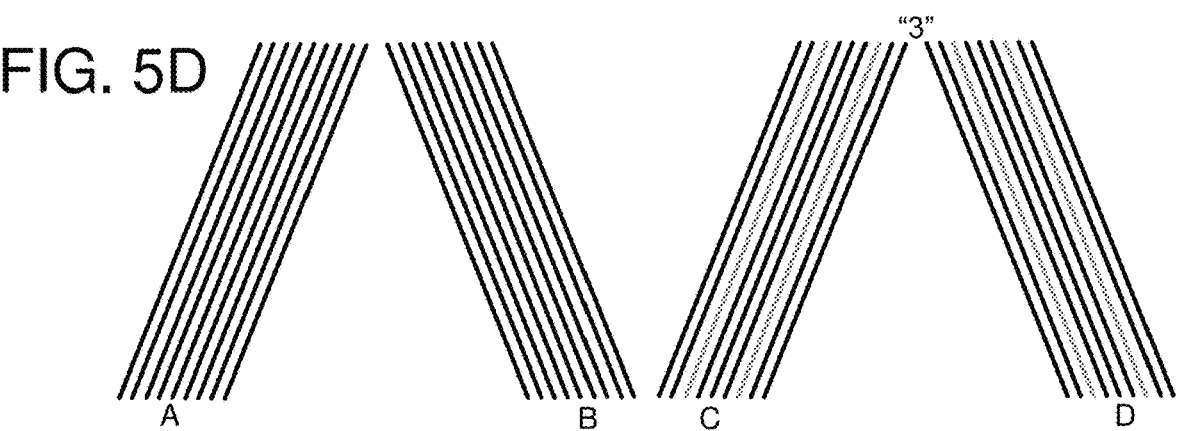
Figure 5E:
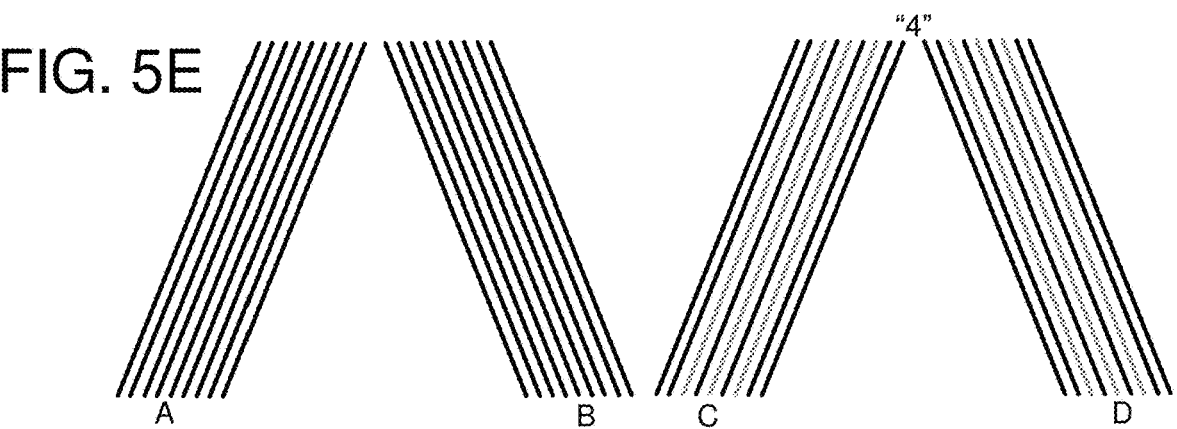
Figure 5F:
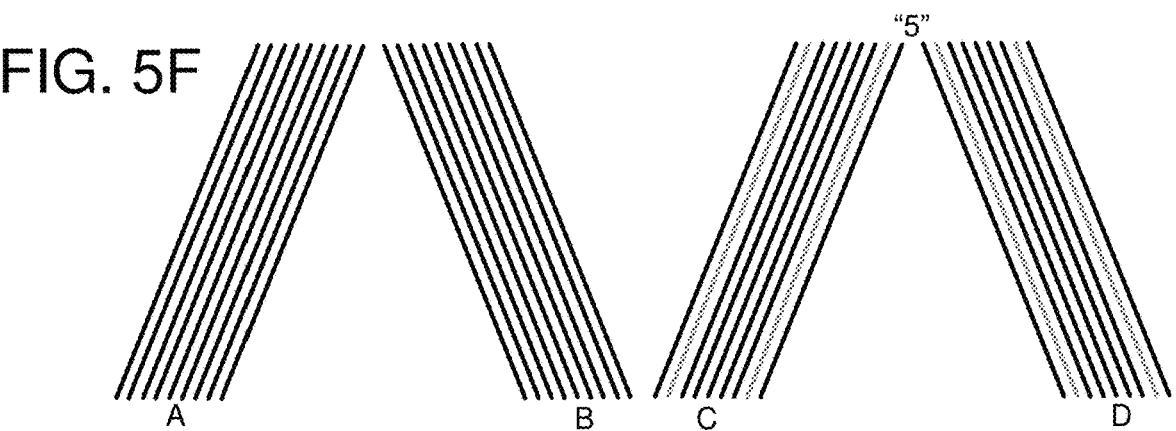
Figure 5G:
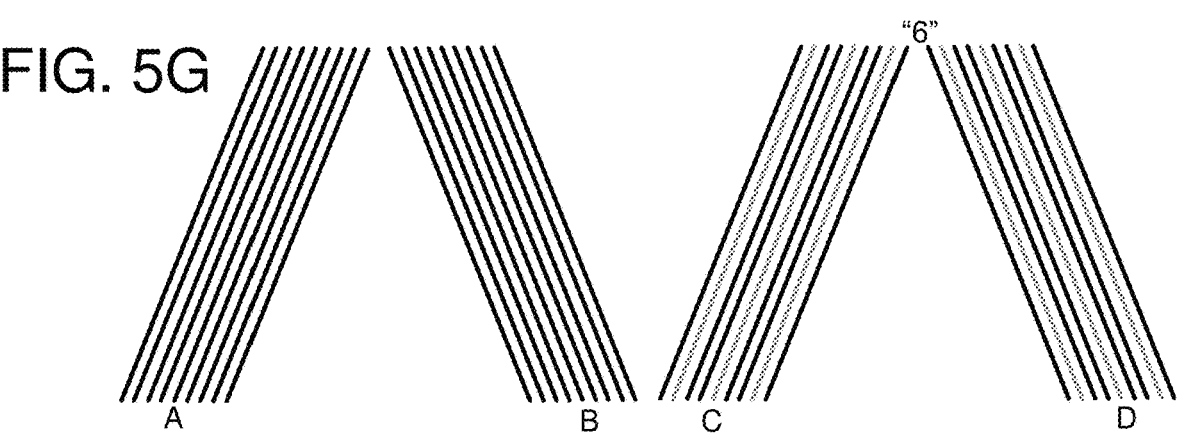
Figure 5H:
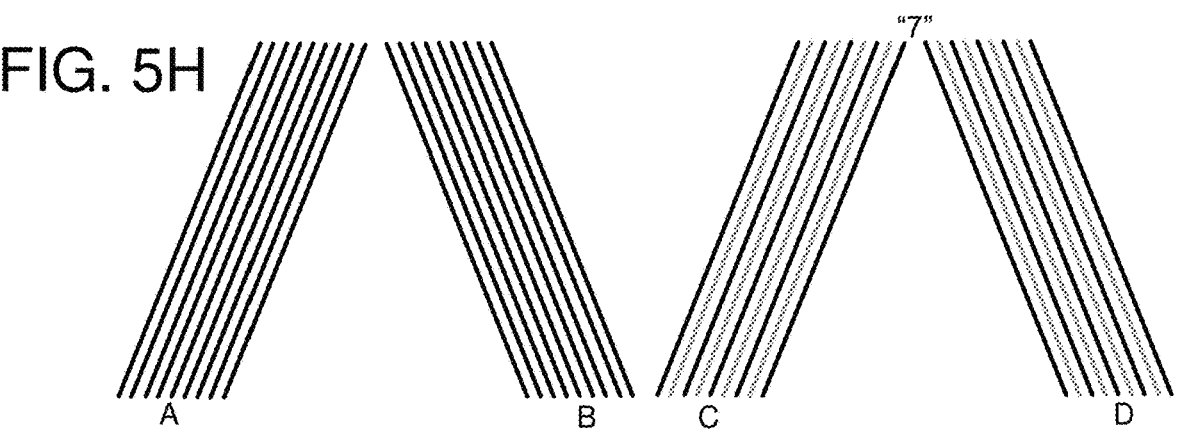

FIGS. 4A-4D show an embodiment wherein the second subframe encodes one of four digital values (i.e., the second subframe encodes two bits of data). In FIG. 4A a "0" is encoded by writing a {7,6} servo frame with the fourth servo stripe missing in the second subframe. In FIG. 4B a "1" is encoded by writing a {7,5} servo frame with the third and fifth servo stripe missing in the second subframe. In FIG. 4C a "2" is encoded by writing a {7,4} servo frame with the second, fourth, and sixth servo stripes missing in the second subframe. In FIG. 4D a "3" is encoded by writing a {7,5} servo frame with the second and sixth servo stripes missing from the second subframe.

FIGS. 5A-5H show an embodiment wherein the second subframe encodes one of eight digital values (i.e., the second subframe encodes three bits of data) by writing various permutations of a {9,N} servo frame. That is, nine servo stripes are written in the first subframe, and N=8, 7, 6 or 5 servo stripes are written in the second subframe depending on the digital value encoded into the second subframe as shown in FIGS. 5A-5H.

Figure 6A:
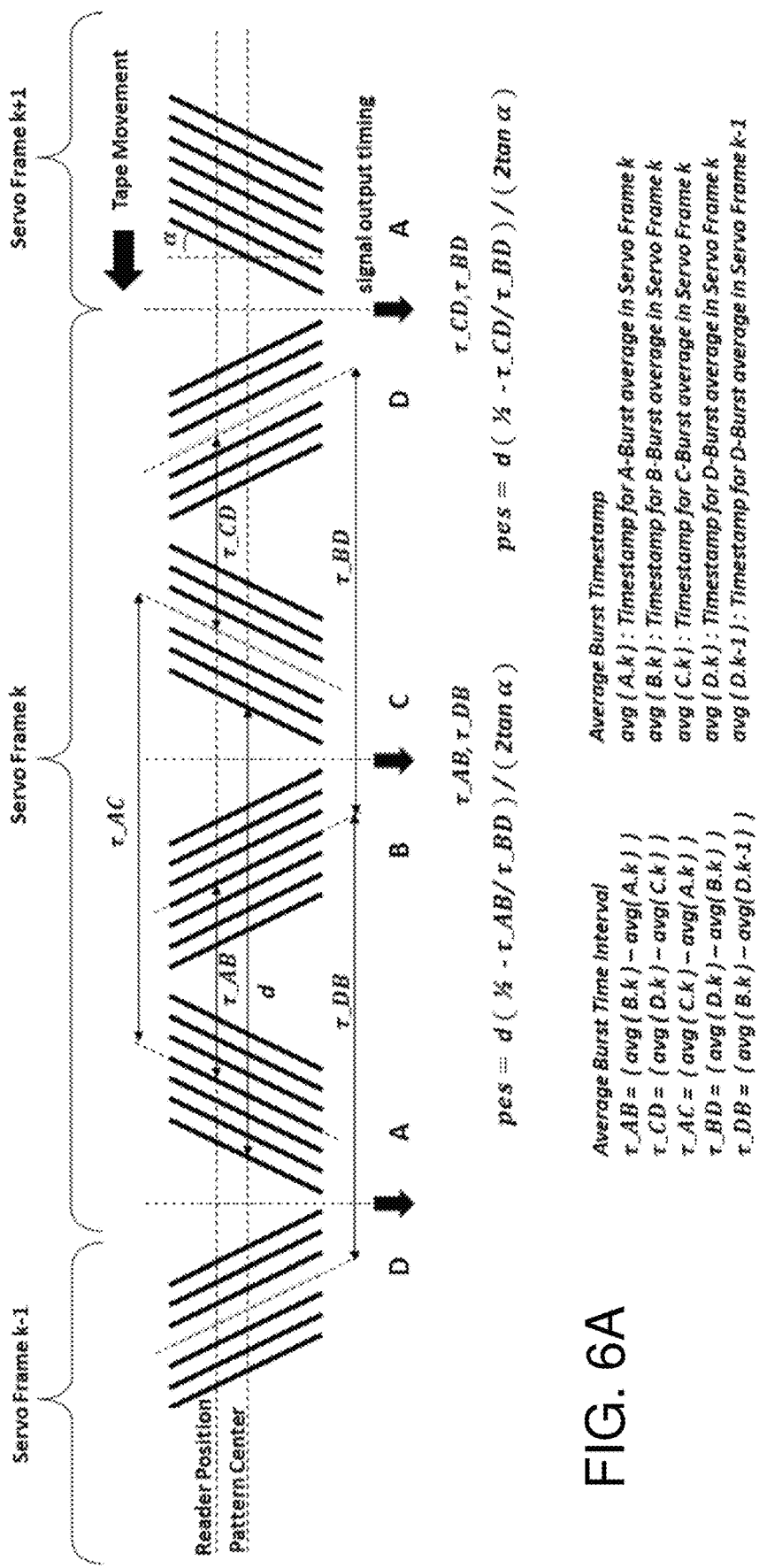
FIGS. 6A and 6B show an embodiment wherein a position error signal (PES) is generated at a rate of two measurements per servo frame.
Figure 6B:
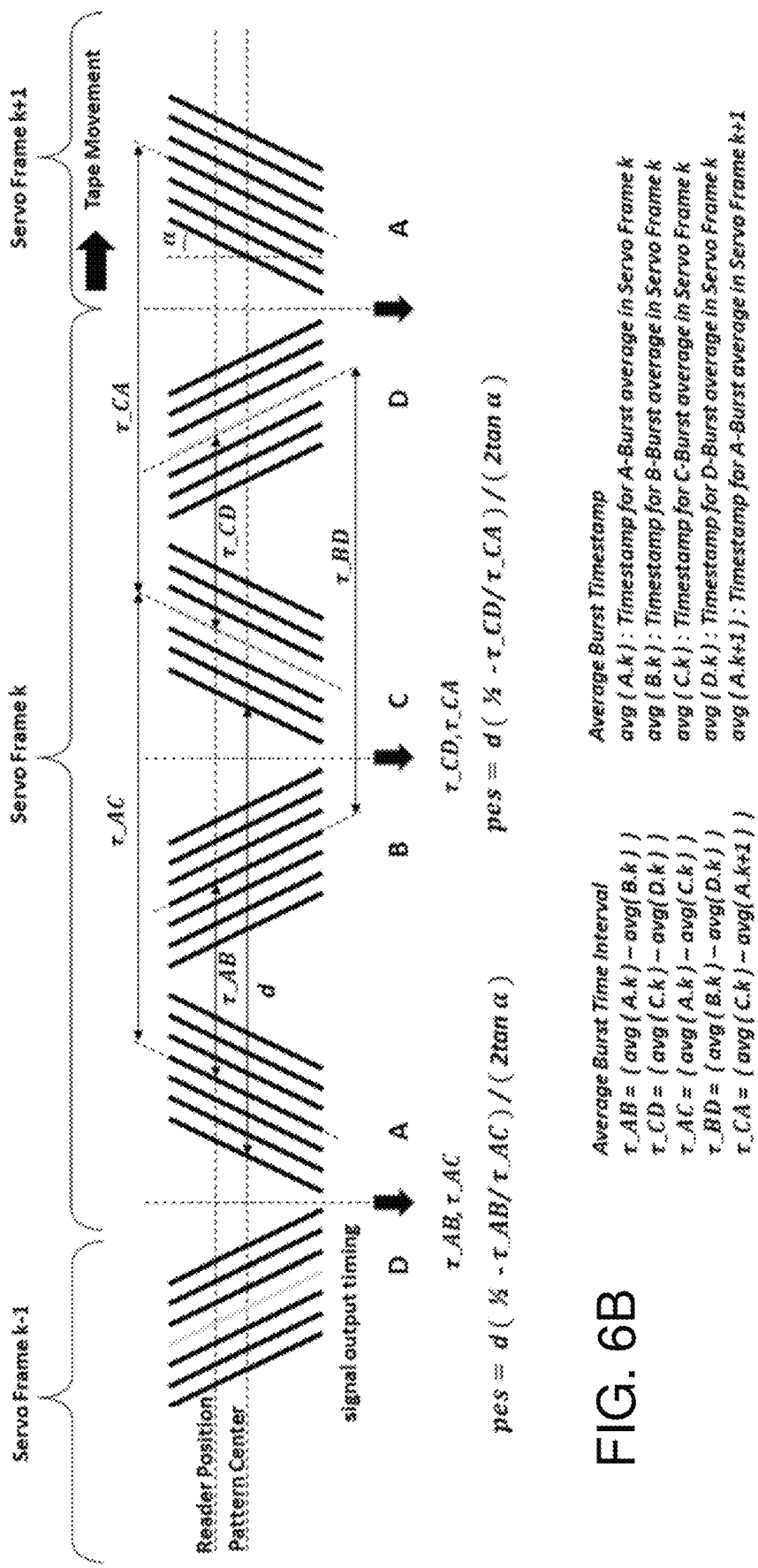
Figure 7A:
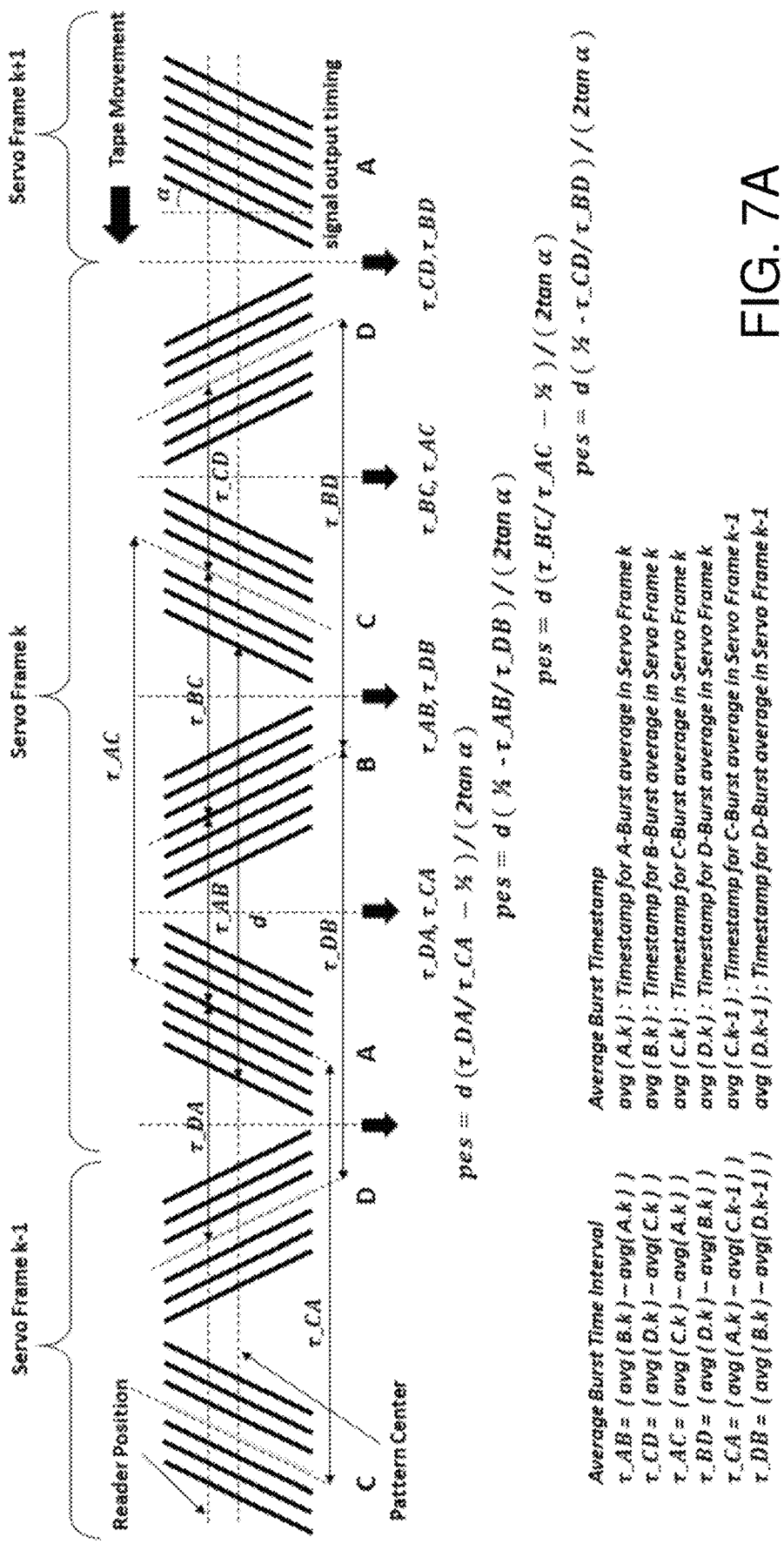
FIGS. 7A and 7B show an embodiment wherein a position error signal (PES) is generated at a rate of four measurements per servo frame.
Figure 7B:
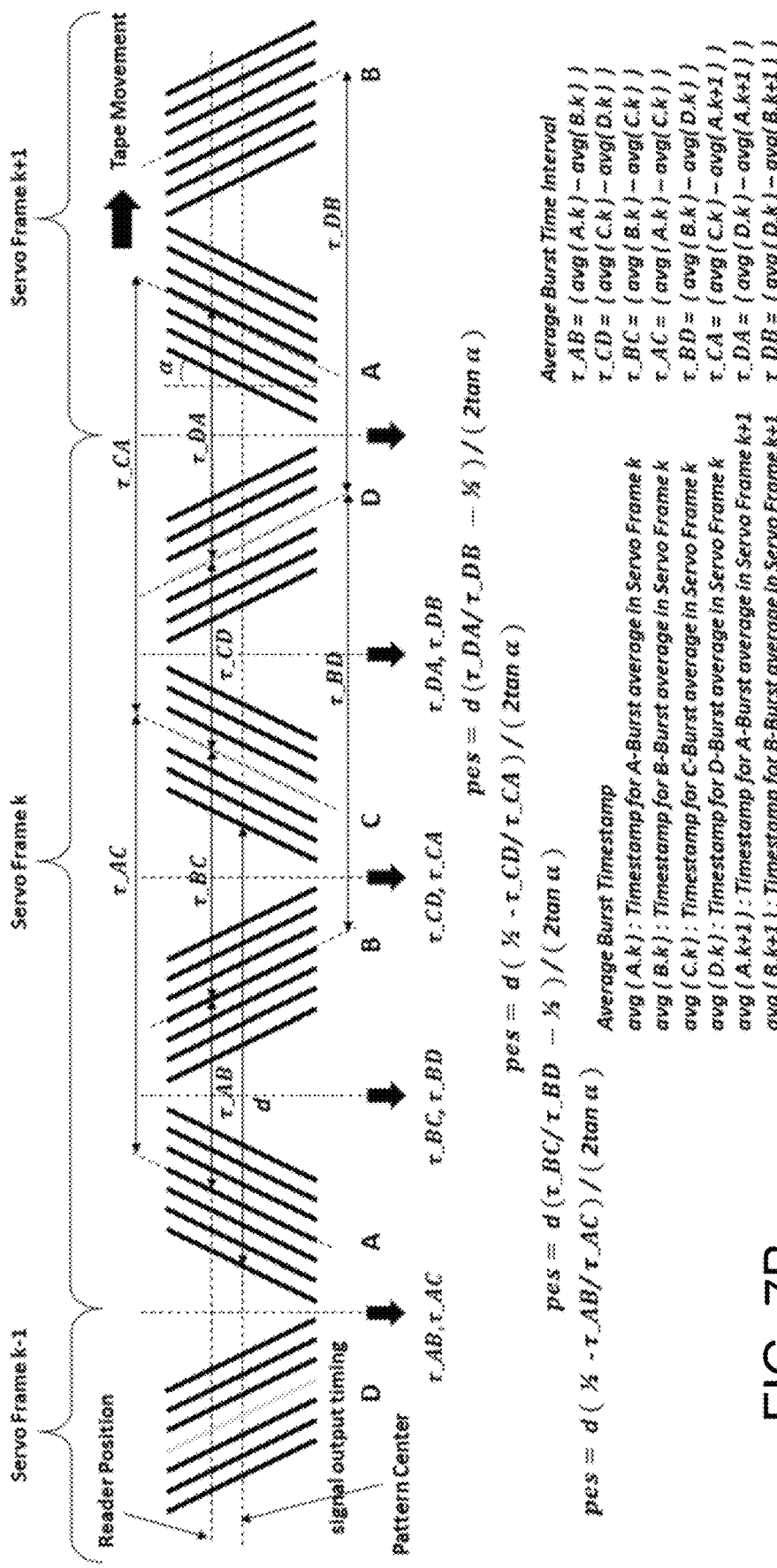

FIGS. 6A and 6B show an embodiment wherein a PES for controlling the lateral position of the head is generated at a rate of two measurements per servo frame. In this embodiment, an average timestamp generated for each servo burst is used to measure an average time interval between the servo bursts. The PES is then generated based on the ratio of selected intervals as shown in FIGS. 6A and 6B in a manner that is independent of tape speed. FIGS. 7A and 7B show a similar embodiment wherein a PES for controlling the lateral position of the head is generated at a rate of four measurements per servo frame.

Figure 8A:
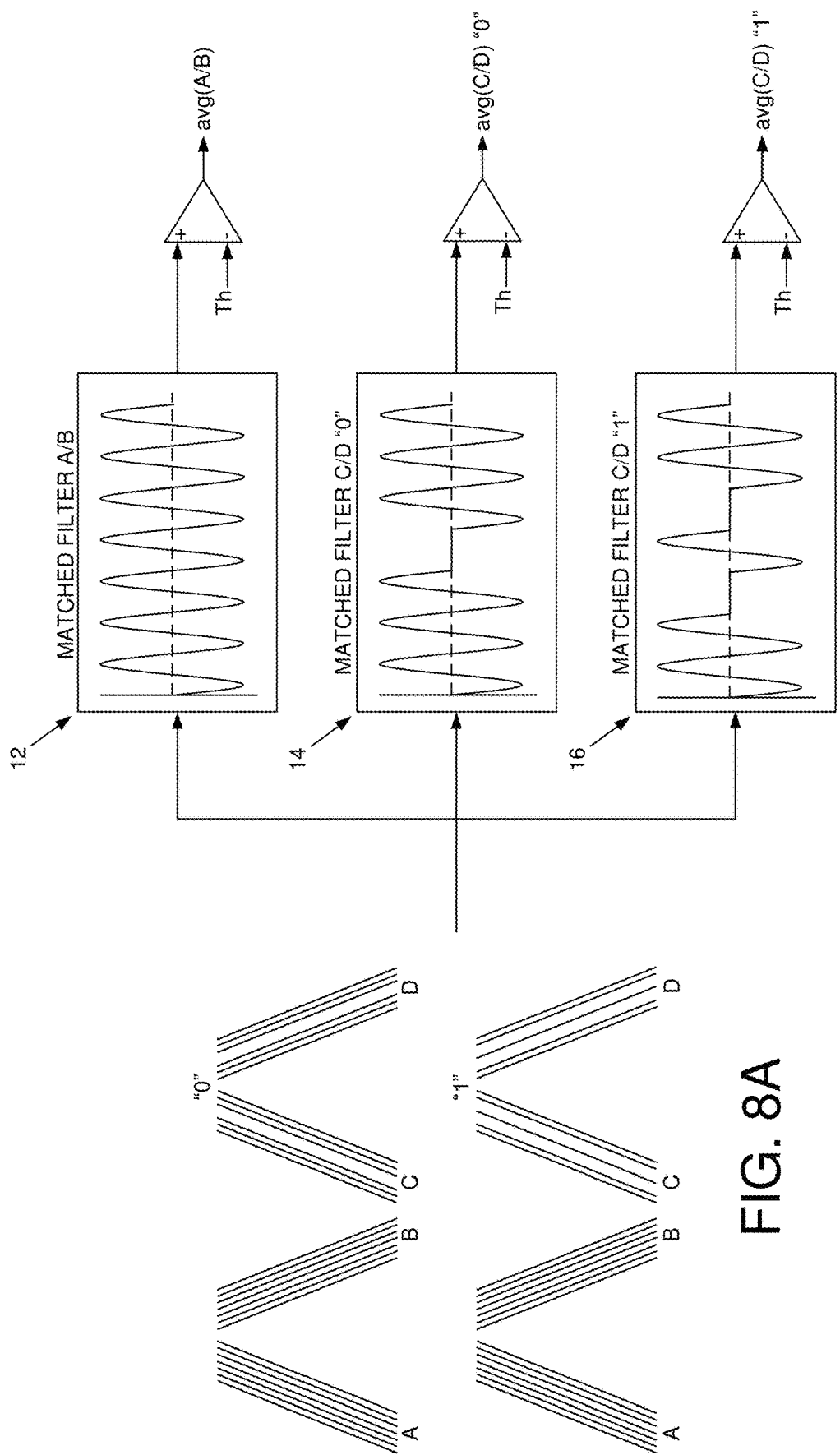
FIGS. 8A and 8B show embodiments wherein a plurality of matched filters measure an average timestamp for each servo burst.

FIG. 8A shows an embodiment wherein a plurality of matched filters each matched to the servo stripes of a servo burst generates the average timestamp in order to generate the PES in the embodiments described above. In addition, the output of the matched filters matched to the C/D servo bursts are also used to demodulate the digital value(s) encoded into the C/D servo bursts. In the example of FIG. 8A, the servo frame format is {7,6} when encoding a digital "0" value or {7,5} when encoding a digital "1" value. A first matched filter 12 correlates the read signal with an expected series of pulses matching the servo stripes of the A/B bursts, a second matched filter 14 correlates the read signal with an expected series of pulses matching the servo stripes of the C/D bursts encoding a "0" digital value, and a third matched filter 16 correlates the read signal with an expected series of pulses matching the servo stripes of the C/D bursts encoding a "1" digital value. In the embodiment of FIG. 8A, the output of each matched filter is compared to a threshold, and the time at which the output exceeds the threshold becomes the average timestamp for the corresponding servo burst. That is, the output of the matched filter that matches the servo burst being read will exceed the threshold due to the correlation exceeding the threshold. In addition, when the output of the matched filter matched to the C/D servo burst exceeds the threshold, the corresponding digital value is also demodulated as shown in FIG. 8A.

Figure 8B:
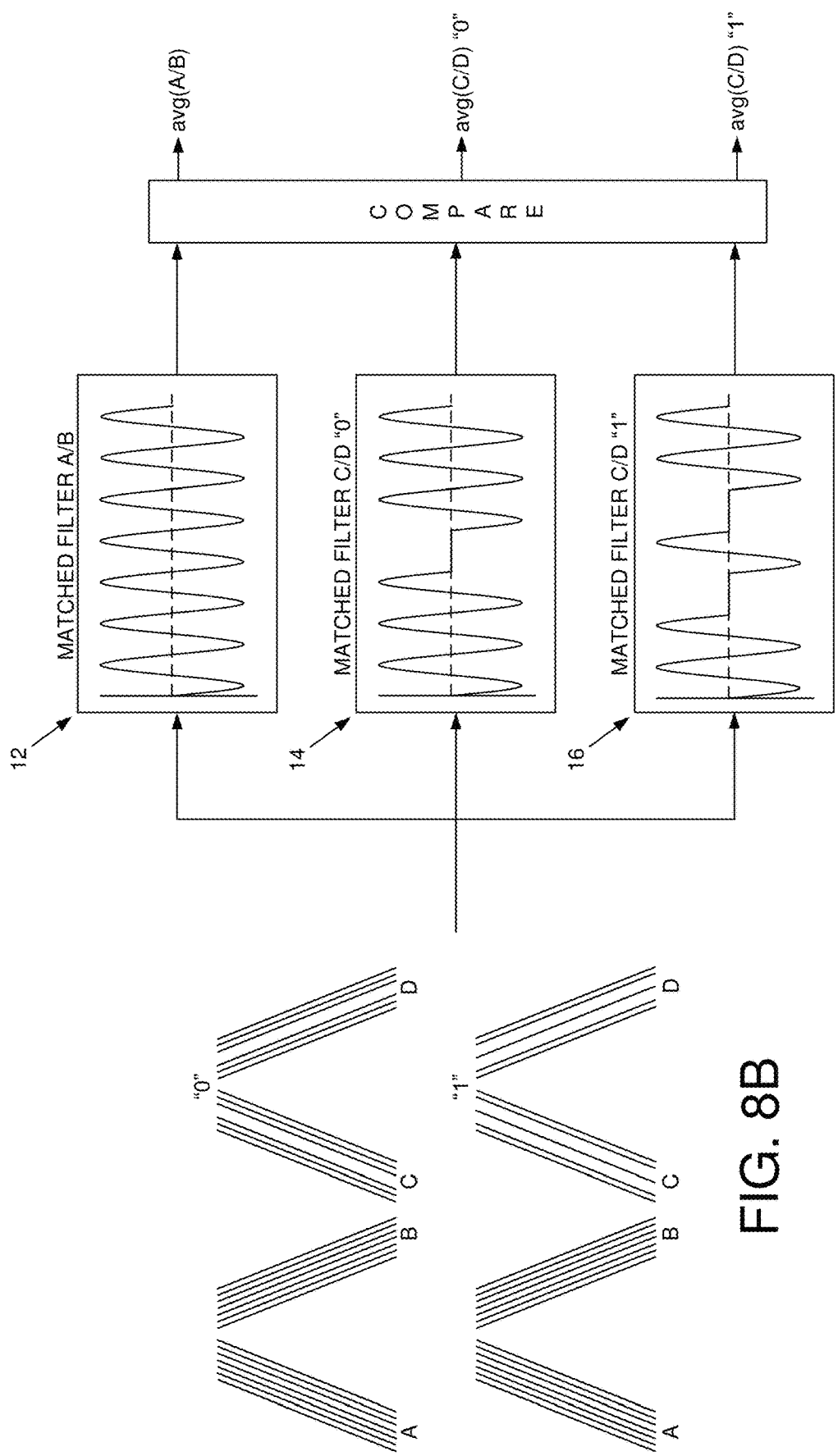

FIG. 8B shows an embodiment wherein the outputs of the matched filters are compared to one another to facilitate generating the timestamps and demodulating the digital values. For example, in one embodiment a timestamp is generated (and a digital value demodulated) when the outputs of each matched filter exceeds a gating threshold indicating the pulses in the read signal align with each of the matched filters (i.e., the correlations reach a maximum). At this point, the matched filter having the highest output (highest correlation) corresponds to the servo burst being read and is therefore used to generate the timestamp as well as demodulate the digital value.

In the embodiment of FIGS. 8A and 8B, the matched filters are shown as operating in continuous time meaning the analog read signal is correlated with an analog filter having a continuous time impulse response substantially matched to the pulses generated by reading the servo stripes in each servo burst. In another embodiment, the matched filters may operate in discrete time meaning the analog signal is sampled, and the signal samples filtered with a digital filter having a discrete time impulse response substantially matched to the signal samples of the pulses generated by reading the servo stripes in each servo burst.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic tape comprising a plurality of servo frames each comprising a plurality of subframes each comprising a plurality of servo bursts, wherein each servo burst comprises a plurality of servo stripes, wherein at least one servo burst of the plurality of servo burst has a missing or unreadable servo stripe, wherein a width of each subframe of the plurality of subframes remains constant, the data storage device comprising:

at least one head configured to access the magnetic tape; and control circuitry configured to:
  read the servo stripes in a first servo burst using the head to generate a first read signal;
  process the first read signal using a first matched filter matched to the first servo burst in order to generate an average time stamp for the servo stripes in the first servo burst, wherein the average time stamp for the first servo burst correlates to a time an output of the first matched filter exceeds a threshold;
  generate a position error signal (PES) based on the average time stamp of the first servo burst; and
  control a position of the head relative to the magnetic tape based on the PES.

2. The data storage device as recited in claim 1, wherein the data storage device comprises the magnetic tape.

3. The data storage device as recited in claim 1, wherein:
  the magnetic tape is housed in a cartridge assembly; and
  the data storage device comprises a tape drive assembly configured to receive the cartridge assembly.

4. The data storage device as recited in claim 1, wherein a first servo frame comprises a first subframe comprising the first servo burst and a second servo burst, and a second subframe comprising a third servo burst and a fourth servo burst, wherein the control circuitry is further configured to:
  read the servo stripes in the third servo burst using the head to generate a second read signal;
  process the second read signal using a second matched filter matched to the third servo burst in order to generate an average time stamp for the servo stripes in the third servo burst; and
  generate the position error signal (PES) based on the average time stamp of the first servo burst and the average time stamp of the third servo burst.

5. The data storage device as recited in claim 4, wherein the control circuitry is further configured to process an output of the first matched filter and an output of the second matched filter in order to distinguish between the first servo burst and the third servo burst.

6. The data storage device as recited in claim 4, wherein the control circuitry is further configured to generate a first digital value based on an output of the second matched filter.

7. The data storage device as recited in claim 6, wherein a second servo frame comprises a first subframe comprising the first servo burst and the second servo burst, and a second subframe comprising a fifth servo burst and a sixth servo burst, wherein the control circuitry is further configured to:
  read the servo stripes in the fifth servo burst using the head to generate a third read signal;
  process the third read signal using a third matched filter matched to the fifth servo burst; and
  generate a second digital value based on an output of the third matched filter.

8. The data storage device as recited in claim 7, wherein the control circuitry is further configured to:
  detect the first digital value when the output of the second matched filter exceeds a threshold; and
  detect the second digital value when the output of the third matched filter exceeds a threshold.

9. The data storage device as recited in claim 7, wherein the control circuitry is further configured to:
  detect the first digital value when the output of the second matched filter exceeds the output of the third matched filter; and detect the second digital value when the output of the third matched filter exceeds the output of the second matched filter.

10. A data storage device configured to access a magnetic tape, the data storage device comprising:
at least one head configured to access the magnetic tape; and
control circuitry configured to:
read servo stripes in a first servo burst of a first subframe of a first servo frame on the magnetic tape using the head to generate a first read signal;
process the first read signal using a first matched filter matched to the first servo burst in order to generate a first average time stamp for the servo stripes in the first servo burst;
generate a first position error signal (PES) based on the first average time stamp of the first servo burst;
read servo stripes in a second servo burst of a second subframe of the first servo frame on the magnetic tape using the head to generate a second read signal; wherein:
at least one of the first servo burst and the second servo burst has a missing or unreadable servo stripe; and
the first subframe has a first width and the second subframe as a second width equal to the first width;
process the second read signal using a second matched filter matched to the second servo burst in order to generate a second average time stamp for the servo stripes in the second servo burst;
generate a second PES based on the second average time stamp of the second servo burst; and
control a position of the head relative to the magnetic tape based on the first PES and the second PES.

11. The data storage device as recited in claim 10, wherein the data storage device comprises the magnetic tape.

12. The data storage device as recited in claim 10, wherein:
the magnetic tape is housed in a cartridge assembly; and
the data storage device comprises a tape drive assembly configured to receive the cartridge assembly.

13. The data storage device as recited in claim 10, wherein the control circuitry is further configured to process an output of the first matched filter and an output of the second matched filter in order to distinguish between the first servo burst and the second servo burst.

14. The data storage device as recited in claim 10, wherein the control circuitry is further configured to generate a first digital value based on an output of the second matched filter.

15. The data storage device as recited in claim 14, wherein the control circuitry is further configured to:
read servo stripes of a third servo burst using the head to generate a third read signal;
process the third read signal using a third matched filter matched to the third servo burst; and
generate a second digital value based on an output of the third matched filter.

16. The data storage device as recited in claim 15, wherein the control circuitry is further configured to:
detect the first digital value when the output of the second matched filter exceeds a threshold; and
detect the second digital value when the output of the third matched filter exceeds a threshold.

17. The data storage device as recited in claim 15, wherein the control circuitry is further configured to:
detect the first digital value when the output of the second matched filter exceeds the output of the third matched filter; and
detect the second digital value when the output of the third matched filter exceeds the output of the second matched filter.

18. A data storage device configured to access a magnetic tape, the data storage device comprising:
at least one head configured to access the magnetic tape;
a means for reading servo stripes in a first servo burst of a first subframe on the magnetic tape using the head to generate a first read signal;
a means for generating an average time stamp for the servo stripes in the first servo burst, wherein the average time stamp for the first servo burst correlates to a time an output of a first matched filter exceeds a threshold;
a means for generating a position error signal (PES) based on the average time stamp of the first servo burst;
a means for reading servo stripes in a second servo burst of a second subframe using the head to generate a second read signal, wherein:
at least one the first servo burst and the second servo burst has is missing or unreadable servo stripe; and
the first subframe has a first width and the second subframe has a second width equal to the first width;
a means for processing the second read signal to generate an average time stamp for the servo stripes in the second servo burst; and
a means for controlling a position of the head relative to the magnetic tape based on the PES, wherein the PES is generated based on the average time stamp of the first servo burst and the average time stamp of the second servo burst.

19. The data storage device as recited in claim 18, further comprising a means for demodulating a first digital value based from the second read signal.

20. The data storage device as recited in claim 18, further comprising:
a means for reading servo stripes of a third servo burst using the head to generate a third read signal; and
a means for demodulating a second digital value from the third read signal.

* * * * *